(12) United States Patent
Kimura et al.

(10) Patent No.: US 9,898,097 B2
(45) Date of Patent: *Feb. 20, 2018

(54) INFORMATION PROCESSING APPARATUS AND CONTROL METHOD OF INFORMATION PROCESSING APPARATUS

(71) Applicant: SEIKO EPSON CORPORATION, Tokyo (JP)

(72) Inventors: Fusashi Kimura, Matsumoto (JP); Kazuo Nishizawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/171,689

(22) Filed: Jun. 2, 2016

(65) Prior Publication Data

US 2016/0274680 A1 Sep. 22, 2016

Related U.S. Application Data

(63) Continuation of application No. 14/555,943, filed on Nov. 28, 2014, now Pat. No. 9,383,581.

(30) Foreign Application Priority Data

Dec. 13, 2013 (JP) .................................. 2013-257675

(51) Int. Cl.
*G06F 3/0346* (2013.01)
*G02B 27/01* (2006.01)
(Continued)

(52) U.S. Cl.
CPC ......... *G06F 3/0346* (2013.01); *G02B 27/017* (2013.01); *G02B 27/0172* (2013.01);
(Continued)

(58) Field of Classification Search
CPC ....... G02B 27/017; G06F 3/012; G06F 3/013; G06F 3/0346; G06F 3/03547; H04W 52/0254
See application file for complete search history.

(56) References Cited

U.S. PATENT DOCUMENTS 6,101,431 A  8/2000  Niwa et al.
6,972,734 B1  12/2005  Ohshima et al.
(Continued)

FOREIGN PATENT DOCUMENTS

JP   H05-305181 A   11/1993
JP   H07-271546 A   10/1995
(Continued)

*Primary Examiner* — Xuemei Zheng
(74) *Attorney, Agent, or Firm* — Oliff PLC

(57) ABSTRACT

An information processing apparatus includes: an operation unit which receives an operation; a first detection unit which detects a direction of the operation unit; an input and output conversion unit which converts an input of the operation received by the operation unit into an output based on a first regulation, when the direction of the operation unit is in a first state, and converts the input into an output based on a second regulation which is different from the first regulation, when the direction of the operation unit is in a second state; a second detection unit which detects an apparatus state which is at least one of a position and a direction of the information processing apparatus; and a control processing unit which performs a control process of the information processing apparatus, based on the output from the input and output conversion unit and the apparatus state.

14 Claims, 9 Drawing Sheets

(51) Int. Cl.
*G06F 3/01* (2006.01)
*G06F 3/0488* (2013.01)
*G06F 3/0354* (2013.01)
*G06F 3/0484* (2013.01)
*G06T 19/00* (2011.01)

(52) U.S. Cl.
CPC ............ *G06F 3/012* (2013.01); *G06F 3/013* (2013.01); *G06F 3/03547* (2013.01); *G06F 3/0484* (2013.01); *G06F 3/04883* (2013.01); *G06T 19/006* (2013.01); *G02B 27/0176* (2013.01); *G02B 2027/014* (2013.01); *G02B 2027/0187* (2013.01); *G06F 2203/0381* (2013.01)

(56) References Cited

U.S. PATENT DOCUMENTS

| | | | |
|---|---|---|---|
| 8,392,735 B2* | 3/2013 | Mucignat | G06F 1/3203 713/300 |
| 9,047,698 B2 | 6/2015 | Maciocci et al. | |
| 9,081,416 B2 | 7/2015 | Kobayashi | |
| 9,261,700 B2 | 2/2016 | Li et al. | |
| 2005/0156817 A1 | 7/2005 | Iba | |
| 2005/0264527 A1 | 12/2005 | Lin | |
| 2007/0290998 A1* | 12/2007 | Choi | G06F 3/0346 345/158 |
| 2009/0271732 A1 | 10/2009 | Kondo et al. | |
| 2010/0259471 A1 | 10/2010 | Takano et al. | |
| 2012/0235902 A1* | 9/2012 | Eisenhardt | A42B 3/042 345/156 |
| 2012/0242560 A1* | 9/2012 | Nakada | G09G 3/3406 345/8 |
| 2012/0242570 A1 | 9/2012 | Kobayashi | |
| 2012/0297226 A1* | 11/2012 | Mucignat | G06F 1/3203 713/323 |
| 2014/0062841 A1 | 3/2014 | Ishikawa et al. | |
| 2014/0062842 A1* | 3/2014 | Tachibana | H04M 1/6058 345/8 |
| 2016/0291687 A1* | 10/2016 | Kasahara | G06F 3/0488 |

FOREIGN PATENT DOCUMENTS

| | | |
|---|---|---|
| JP | 2011-082781 A | 4/2011 |
| JP | 2013-196527 A | 9/2013 |

* cited by examiner

INFORMATION PROCESSING APPARATUS AND CONTROL METHOD OF INFORMATION PROCESSING APPARATUS

CROSS-REFERENCE TO RELATED APPLICATIONS

This is a Continuation of application Ser. No. 14/555,943 filed Nov. 28, 2014, which claims priority to Japanese Patent Application JP 2013-257675 filed Dec. 13, 2013. The disclosures of the prior applications are hereby incorporated by reference herein in their entirety.

BACKGROUND

1. Technical Field

The present invention relates to an information processing apparatus.

2. Related Art

A head mounted display (HMD) which is a display device to be mounted on the head has been known as one information processing apparatus. The head mounted display, for example, generates image light showing an image using a liquid crystal display and a light source, and introduces the generated image light to the eyes of a user using a projection optical system or a light guide plate, to allow a user to visually recognize a virtual image. An operation with buttons or a track pad, movement of the head of a user detected by various sensors, and the like are known as means for controlling the head mounted display.

JP-A-2011-82781 discloses a head mounted display in which a gyro sensor is embedded in a remote controller which is an operation unit, and the head mounted display is operated according to an angular velocity detected by the gyro sensor. In addition, JP-A-5-305181 discloses a game machine which allows a plurality of players to play the same game, and allows easy sterilization of a head mounted display by detachably attaching the head mounted display to a main body of the game machine.

However, in the head mounted display disclosed in JP-A-2011-82781, the operation of the head mounted display may be performed with the gyro sensor embedded in the operation unit, but it is difficult to mount a sensor other than the gyro sensor embedded in the operation unit in order to perform an operation different from the operation performed with the angular velocity detected by the gyro sensor, according to a detected result of the other sensor. In addition, depending on an operation system (hereinafter, also simply referred to as an "OS"), it is difficult to perform a plurality of control operations corresponding to each detected result, with respect to the detected results from the plurality of sensors, and it is difficult to perform the plurality of control operations without changing the OS. The problems described above are not limited to the head mounted display, but commonly occur in an information processing apparatus including an operation unit.

SUMMARY

An advantage of some aspects of the invention is to solve at least a part of the problems described above, and the invention can be implemented as the following forms.

(1) An aspect of the invention provides an information processing apparatus. The information processing apparatus includes: an operation unit which receives an operation; a first detection unit which detects a direction of the operation unit; an input and output conversion unit which converts an input of the operation received by the operation unit into an output based on a first regulation, when the direction of the operation unit is in a first state, and converts the input into an output based on a second regulation which is different from the first regulation, when the direction of the operation unit is in a second state which is different from the first state; a second detection unit which detects an apparatus state which is at least one of a position and a direction of the information processing apparatus; and a control processing unit which performs a control process of the information processing apparatus, based on the output from the input and output conversion unit and the apparatus state. With this configuration, since the different control operations are performed in accordance with detected results of a plurality of detection units, it is possible to perform various control operations with respect to the information processing apparatus.

(2) In the information processing apparatus of the aspect described above, the first detection unit may be disposed in the operation unit and may detect the direction of the operation unit using an acceleration of the operation unit. With this configuration, since the control operation of the information processing apparatus is performed based on the input using the direction of the detected acceleration as a reference, and not the direction of the operation unit, a user can perform the input using the direction of the detected acceleration as a reference, and user operability is improved.

(3) In the information processing apparatus of the aspect described above, the first state and the second state may be determined based on a relationship between the direction of the operation unit and the direction of gravity. With this configuration, since the control operation of the information processing apparatus is performed based on the direction of the operation unit and the detected direction of a gravitational acceleration, a user can perform the input using the detected direction of the gravitational acceleration as a reference, and user operability is improved.

(4) In the information processing apparatus of the aspect described above, the first state may be a state where an operation angle formed by the direction of the operation unit and the direction of gravity is equal to or smaller than 45 degrees, and the second state may be a state where the operation angle is greater than 45 degrees. With this configuration, since the range of the angle to be converted based on the first regulation is great, the number of times of corrections for converting the input received by the operation unit into the output is limited, it is easy to perform the control operation for converting the input into the output, it is possible to decrease the load of the information processing apparatus, and it is possible to reduce a frequency of detecting the direction of the operation unit.

(5) In the information processing apparatus of the aspect described above, the second state may include a third state where the operation angle is greater than 45 degrees and equal to or smaller than 135 degrees, and a fourth state where the operation angle is greater than 135 degrees, and the input and output conversion unit may convert the input of the operation received by the operation unit into an output based on a third regulation different from the first regulation, in the case of the third state, and may convert the input into an output based on a fourth regulation different from the first regulation and the third regulation, in the case of the fourth state. With this configuration, since the converted angle is divided into a limited number, it is easy to correct the input received by the operation unit to the output, it is possible to decrease the load of the information processing apparatus, and it is possible to reduce the frequency of detecting the direction of the operation unit.

(6) The information processing apparatus of the aspect described above may further include an image display unit which forms image light based on image data and allows a user to visually recognize the image light as a virtual image, in a state of being mounted on the head of a user, the apparatus state may be at least one of a position and a direction of the operation unit or the image display unit, and the control processing unit may control the image light formed by the image display unit, as the control process. With this configuration, an image or external scenery visually recognized by a user differs depending on the state of a user, and user convenience is improved.

(7) In the information processing apparatus of the aspect described above, the second detection unit may be disposed in the image display unit and may detect at least one of the position and the direction of the image display unit, and the control processing unit may set a position of the image light formed in the image display unit, as the control process. With this configuration, since an image or the external scenery visually recognized by a user differs depending on the change of a visual line direction or the direction of the head of a user, user convenience is further improved.

(8) In the information processing apparatus of the aspect described above, the first detection unit may detect the direction of the operation unit with a frequency smaller than once every 0.5 seconds. With this configuration, it is not necessary to constantly detect the acceleration acting on the operation unit, and it is possible to suppress the load applied to the information processing apparatus to improve user convenience.

(9) In the information processing apparatus of the aspect described above, the control processing unit may include an operating system, and the input and output conversion unit may a device driver or middleware. With this configuration, since the first detection unit and the input and output conversion unit corresponding to the operation unit are used, the load relating to the control operation of the information processing apparatus is decreased, it is not necessary to change the software such as an operating system, and it is possible to reduce a development period of the information processing apparatus.

All of the plurality of constituent elements included in each aspect of the invention are not compulsory, and modification, removal, replacement with other new constituent elements, and removal of partial limited content can be suitably performed regarding the constituent elements which are a part of the plurality of constituent elements, in order to solve some or all of the problems described above or in order to realize some or all of the advantages described in the specification. Some or all of the technical features included in one aspect of the invention described above can be combined with some or all of the technical features included in the other aspect of the invention described above to serve as one independent aspect of the invention, in order to solve some or all of the problems described above or in order to realize some or all of the advantages described in the specification.

For example, one aspect of the invention can be realized as an apparatus including one or more or all of the five elements which are the operation unit, the first detection unit, the input and output conversion unit, the second detection unit, and the control processing unit. That is, this apparatus may or may not include the operation unit. The apparatus may or may not include the first detection unit. The apparatus may or may not include the input and output conversion unit. The apparatus may or may not include the second detection unit. The apparatus may or may not include the control processing unit. The operation unit, for example, may receive the operation. The first detection unit, for example, may detect the direction of the operation unit. The input and output conversion unit, for example, may convert an input of the operation received by the operation unit into an output based on a first regulation, when the direction of the operation unit is in a first state, may convert the input into an output based on a second regulation which is different from the first regulation, when the direction of the operation unit is in a second state which is different from the first state. The second detection unit, for example, may detect an apparatus state which is at least one of a position and a direction of the information processing apparatus. The control processing unit, for example, may perform a control process of the information processing apparatus, based on the output from the input and output conversion unit and the apparatus state. This apparatus, for example, can be realized as the information processing apparatus, but can also be realized as an apparatus other than the information processing apparatus. According to the aspect, it is possible to solve at least one problem among various problems, such as improvement and ease of operability of the device, integration of the device, or improvement of user convenience of the apparatus. Some or all of the technical features of each aspect of the information processing apparatus can be applied to this apparatus.

The invention can be realized as various aspects other than the information processing apparatus. For example, the invention can be realized in the aspect of a head mounted display, a control method of an information processing apparatus or a head mounted display, an information processing system, a head mounted type display system, a computer program for realizing an information processing system or a head mounted type display system, a recording medium with the computer program recorded therein, and a data signal including the computer program realized in a carrier wave.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. Embodiment

A-1. Configuration of Head Mounted Display

Figure 1:
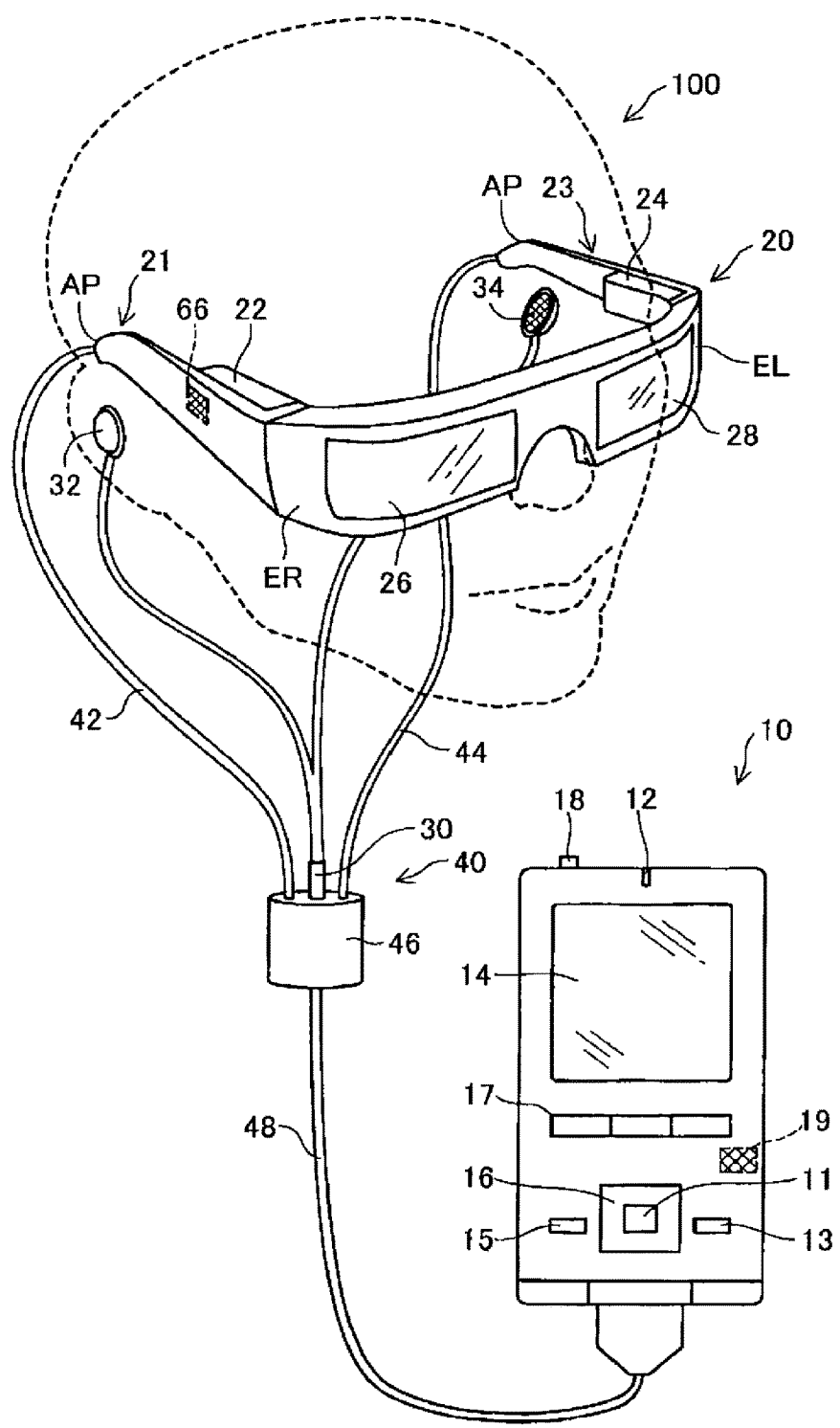
FIG. 1 is an explanatory diagram showing an appearance configuration of a head mounted display.

FIG. 1 is an explanatory diagram showing an appearance configuration of a head mounted display 100. The head mounted display 100 is a display device to be mounted on the head, and is also called a head mounted display (HMD). The head mounted display 100 of the embodiment is an optical transmission type head mounted display which allows a user to visually recognize a virtual image and to directly visually recognize external scenery at the same time. In the present specification, the virtual image which is visually recognized by a user using the head mounted display 100 is also referred to as a "display image" for the sake of convenience. In addition, emission of image light generated based on image data is also referred to as "display of an image".

The head mounted display 100 includes an image display unit 20 which allows a user to visually recognize a virtual image in a state of being mounted on the head of a user, and a control unit 10 (controller 10) which controls the image display unit 20.

The image display unit 20 is a body to be mounted on the head of a user, and has the shape of glasses in the embodiment. The image display unit 20 includes a right holding unit 21, a right display driving unit 22, a left holding unit 23, a left display driving unit 24, a right optical image display unit 26, a left optical image display unit 28, and a 10-axis sensor 66. The right optical image display unit 26 and the left optical image display unit 28 are disposed so as to be positioned in front of right and left eyes of a user when the image display unit 20 is mounted thereon. One end of the right optical image display unit 26 and one end of the left optical image display unit 28 are connected to each other in a position between the eyebrows of a user when the image display unit 20 is mounted thereon.

The right holding unit 21 is a member which is provided extending from an end portion ER which is the other end of the right optical image display unit 26 to a position corresponding to a temple of a user when the image display unit 20 is mounted on a user. In the same manner as described above, the left holding unit 23 is a member which is provided extending from an end portion EL which is the other end of the left optical image display unit 28 to a position corresponding to a temple of a user when the image display unit 20 is mounted thereon. The right holding unit 21 and the left holding unit 23 hold the image display unit 20 on the head of a user, as temples do for glasses.

The right display driving unit 22 and the left display driving unit 24 are disposed at a side facing the head of a user when the image display unit 20 is mounted thereon. Hereinafter, the right holding unit 21 and the left holding unit 23 are also collectively simply referred to as the "holding units", the right display driving unit 22 and the left display driving unit 24 are also collectively simply referred to as the "display driving units", and the right optical image display unit 26 and the left optical image display unit 28 are also collectively simply referred to as the "optical image display units".

The display driving units 22 and 24 include liquid crystal displays 241 and 242 (hereinafter, also referred to as "LCDs 241 and 242"), projection optical systems 251 and 252, and the like (see FIG. 2). The configuration of the display driving units 22 and 24 will be described in detail later. The optical image display units 26 and 28 as optical members include light guide plates 261 and 262 (see FIG. 2) and dimming plates. The light guide plates 261 and 262 are formed of a light transmissive resin material and the like, and guide image light output from the display driving units 22 and 24 to eyes of a user. The dimming plates are optical elements having a thin plate shape, and are disposed so as to cover the front side of the image display unit 20 which is a side opposite the side of eyes of a user. The dimming plates protect the light guide plates 261 and 262, and suppress damage or attachment of dirt on the light guide plates 261 and 262. In addition, by adjusting the light transmittance of the dimming plates, an amount of external light entering eyes of a user can be adjusted, and a virtual image can be adjusted so as to be easily visually recognized. The dimming plates can be omitted.

The 10-axis sensor 66 is a sensor which detects an acceleration (three axes), an angular velocity (three axes), geomagnetism (three axes), and an atmosphere (one axes). The 10-axis sensor 66 is embedded in the image display unit 20 in a position near the display driving unit 22, and detects a movement or a position of the head of a user (hereinafter, also simply referred to as a "state of the image display unit 20"), when the image display unit 20 is mounted on the head of a user. The state of the image display unit 20 detected by the 10-axis sensor 66 corresponds to an apparatus state in the claims. The apparatus state of the information processing apparatus in the claims includes at least one of a position and a direction of a part of the information processing apparatus. For example, a state where the position of the image display unit 20 which is a part of the head mounted display 100 is changed and the position and the direction of the device other than the image display unit 20 (for example, control unit 10) of the head mounted display 100 are not changed, corresponds to a case in the claims where the position of the information processing apparatus is changed.

The image display unit 20 further includes a connection unit 40 for connecting the image display unit 20 to the control unit 10. The connection unit 40 includes a main body cord 48 connected to the control unit 10, a right cord 42, a left cord 44, and a coupling member 46. The right cord 42 and the left cord 44 are two cords branched from the main body cord 48. The right cord 42 is inserted into a housing of the right holding unit 21 from an end portion AP of the right holding unit 21 in an extension direction, and is connected to the right display driving unit 22. In the same manner as described above, the left cord 44 is inserted into a housing of the left holding unit 23 from an end portion AP of the left holding unit 23 in an extension direction, and is connected to the left display driving unit 24. The coupling member 46 is provided at a branched point of the main body cord 48, and the right cord 42 and the left cord 44, and includes a jack for connecting an earphone plug 30. A right earphone 32 and a left earphone 34 extend from the earphone plug 30.

The image display unit 20 and the control unit 10 transmit various signals through the connection unit 40. An end portion of the main body cord 48 at a side opposite the coupling member 46, and the control unit 10 include connectors (not shown) fitted to each other, respectively. The control unit 10 and the image display unit 20 are connected to each other or disconnected from each other, by fitting of the connector of the main body cord 48 and the connector of the control unit 10 to each other or releasing fitting thereof from each other. Metal cables or optical fiber can be used as the right cord 42, the left cord 44, and the main body cord 48, for example.

The control unit 10 is a device for controlling the head mounted display 100. The control unit 10 includes a determination key 11, a lighting unit 12, a display switching key 13, a track pad 14, a luminance switching key 15, a direction key 16, a menu key 17, a power switch 18, and an acceleration sensor 19. The determination key 11 detects a pressing operation and outputs a signal for determining content operated in the control unit 10. The lighting unit 12 notifies an operation state of the head mounted display 100 with a light emitting state thereof. The operation state of the head mounted display 100 is, for example, the ON or OFF state of the power. A light emitting diode (LED) is used as the lighting unit 12, for example. The display switching key 13 detects a pressing operation and outputs a signal for switching the display mode of a moving content image to 3D or 2D, for example. The track pad 14 detects an operation of a finger of a user on an operation surface of the track pad 14 and outputs a signal corresponding to the detected content. Various track pads such as electrostatic, pressure-detection type, or optical track pads can be used as the track pad 14. The luminance switching key 15 detects a pressing operation and outputs a signal for increasing or decreasing luminance of the image display unit 20. The direction key 16 detects a pressing operation for a key corresponding to the up, down, right, and left directions and outputs a signal corresponding to the detected content. The power switch 18 detects a sliding operation of a switch to switch a power state of the head mounted display 100. The acceleration sensor 19 acquires the acceleration (for example, gravitational acceleration) acting on the control unit 10. In the embodiment, the acceleration sensor 19 acquires the acceleration acting on the control unit 10, on a regular basis, once every 0.5 seconds.

Figure 2:
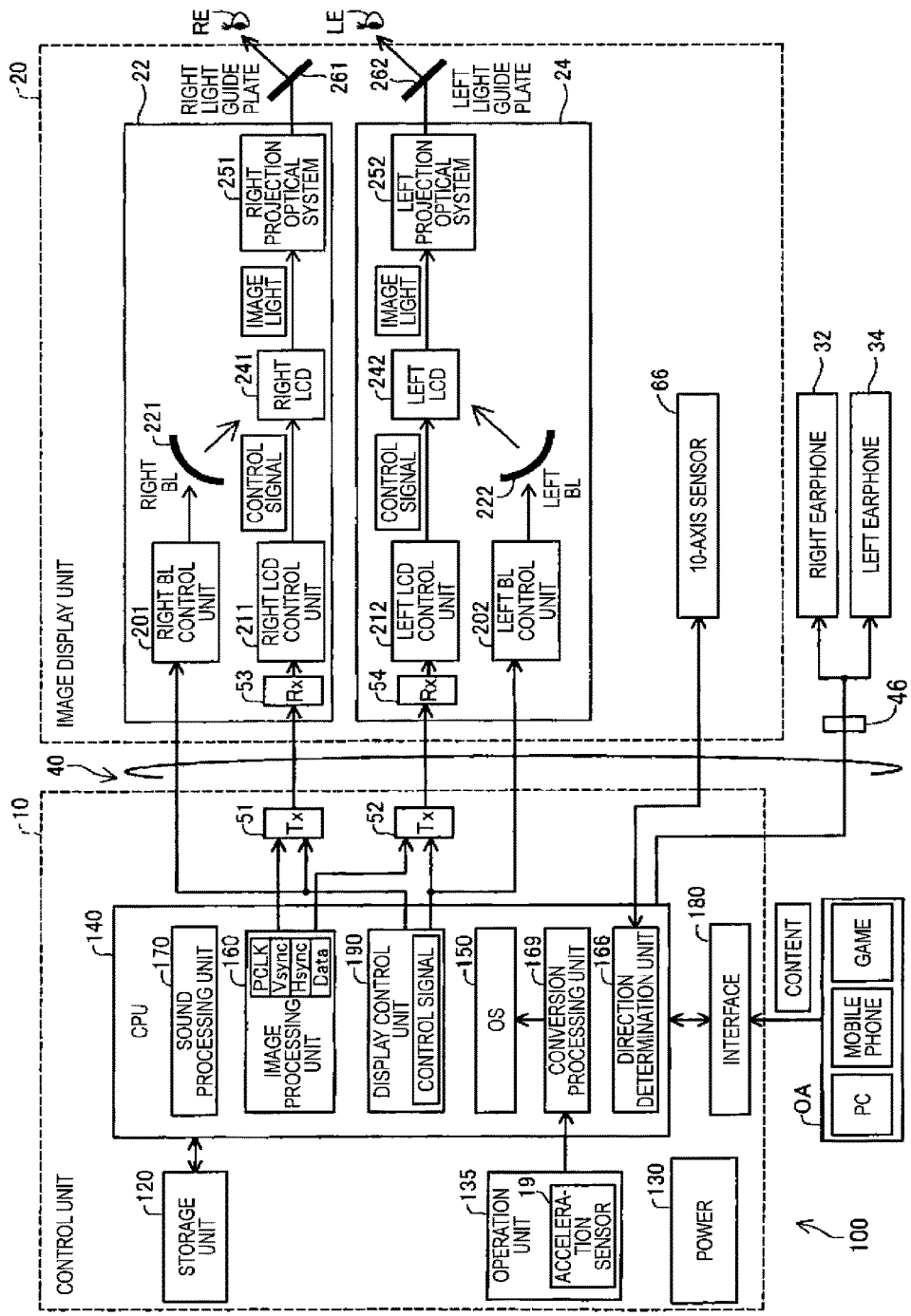
FIG. 2 is a functional block diagram showing a configuration of the head mounted display.

FIG. 2 is a functional block diagram showing a configuration of the head mounted display 100. As shown in FIG. 2, the control unit 10 includes a storage unit 120, a power 130, an operation unit 135, a CPU 140, an interface 180, a transmission unit 51 (Tx 51), and a transmission unit 52 (Tx 52). The operation unit 135 receives an operation from a user, and is configured with the determination key 11, the display switching key 13, the track pad 14, the luminance switching key 15, the direction key 16, the menu key 17, the power switch 18, and the acceleration sensor 19.

The power 130 supplies power to each unit of the head mounted display 100. A secondary battery can be used as the power 130, for example. The storage unit 120 stores various computer programs. The storage unit 120 is configured with a ROM or a RAM. The CPU 140 reads out and executes the computer programs stored in the storage unit 120 and functions as an operating system 150 (OS 150), a display control unit 190, a direction determination unit 166, an image processing unit 160, a sound processing unit 170, and an input and output conversion unit 169.

The OS 150 used in the embodiment is Android (trademark). Using Android, it is difficult to perform a plurality of control operations according to results detected from a plurality of sensors. In the embodiment, Android is used as the OS 150, but another OS may be used in the other embodiment.

The display control unit 190 generates a control signal for controlling the right display driving unit 22 and the left display driving unit 24. In detail, the display control unit 190 separately controls ON and OFF states of driving of the right LCD 241 by a right LCD control unit 211, the ON and OFF states of the driving of a right backlight 221 by a right backlight control unit 201, the ON and OFF states of the driving of the left LCD 242 by a left LCD control unit 212, and the ON and OFF states of the driving of a left backlight 222 by a left backlight control unit 202, with the control signals. Accordingly, the display control unit 190 controls generation and emission of the image light by each of the right display driving unit 22 and the left display driving unit 24. For example, the display control unit 190 generates the image light for both of the right display driving unit 22 and the left display driving unit 24, generates the image light for one thereof, or does not generate the image light for both thereof. The display control unit 190 transmits the respective control signals with respect to the right LCD control unit 211 and the left LCD control unit 212 through the transmission units 51 and 52. In addition, the display control unit 190 transmits the respective control signals with respect to the right backlight control unit 201 and the left backlight control unit 202.

The direction determination unit 166 specifies a visual line direction of a user, based on the direction of the image display unit 20 specified by the 10-axis sensor 66. In the embodiment, in a case where the visual line direction is changed, the direction determination unit 166 determines whether or not the change in an angle formed by the initial visual line direction and the changed visual line direction in a predetermined unit period (hereinafter, also referred to as a "changed angle") is equal to or greater than a threshold value. The direction determination unit 166 and the 10-axis sensor 66 correspond to a second detection unit in the claims.

The image processing unit 160 acquires an image signal included in the content. The image processing unit 160 separates a synchronization signal such as a vertical synchronization signal VSync or a horizontal synchronization signal HSync from the acquired image signal. In addition, the image processing unit 160 generates a clock signal PCLK in accordance with the separated vertical synchronization signal VSync or the horizontal synchronization signal HSync, by using a phase locked loop (PLL) circuit (not shown) or the like. The image processing unit 160 converts an analog image signal with the separated synchronization signal into a digital image signal using an A/D conversion circuit (not shown) or the like. After that, the image processing unit 160 stores the converted digital image signal in a DRAM in the storage unit 120 for each frame, as image data (RGB data) of a target image. The image processing unit 160, if necessary, may execute an image process such as a resolution conversion process, various color tone correction process such as adjustment of luminance and chroma, or a keystone correction process, with respect to the image data.

The image processing unit 160 transmits the generated clock signal PCLK, the vertical synchronization signal VSync, the horizontal synchronization signal HSync, and the image data Data stored in the DRAM in the storage unit 120 through the transmission units 51 and 52. The image data Data transmitted through the transmission unit 51 is also referred to as "image data for the right eye", and the image data Data transmitted through the transmission unit 52 is also referred to as "image data for the left eye". The transmission units 51 and 52 function as a transceiver for serial transmission between the control unit 10 and the image display unit 20.

In addition, the image processing unit 160 performs various control operations of a display image to be displayed on the image display unit 20, based on a visual line direction of a user specified by the direction determination unit 166. In the embodiment, the image processing unit 160 controls whether or to not display the image displayed on the image display unit 20, according to the changed angle of the visual line direction determined by the direction determination unit 166. For example, when the changed angle of the visual line direction is equal to or greater than the threshold value, the image processing unit 160 does not display the display image displayed on the image display unit 20.

The sound processing unit 170 acquires a sound signal included in the content, amplifies the acquired sound signal, and supplies the sound signal to a speaker (not shown) in the right earphone 32 and a speaker (not shown) in the left earphone 34 connected to the coupling member 46. For example, in the case that a Dolby (trademark) system is used, a process with respect to the sound signal is performed, and different sounds with changed frequencies, for example, are output from the right earphone 32 and the left earphone 34.

The input and output conversion unit 169 is a device driver which acquires a signal according to the operation input from a user and a signal indicating an acceleration acting on the control unit 10 in which the operation unit 135 is formed, and transmits an output signal to the OS 150 based on the acquired signals. As the signal according to the operation input, an operation input with respect to the track pad 14, the direction key 16, and the power switch 18 of the operation unit 135 is used, for example. The input and output conversion unit 169 specifies a direction of the operation unit 135 and the direction of gravity as the inputs, based on the acceleration acquired by the acceleration sensor 19. The input and output conversion unit 169 determines a conversion angle for converting the inputs into the output signal, based on an angle formed by the direction of the operation unit 135 and the direction of gravity. The conversion angle is an angle for correcting the angle formed by the direction of the operation unit 135 and the direction of gravity as the inputs, when the input and output conversion unit 169 transmits the output signal to the OS 150. The input and output conversion unit 169 converts the inputs received by the track pad 14 of the operation unit 135 into the output signal based on the conversion angle, and transmits the converted output signal to the OS 150. The signal acquired by the acceleration sensor 19 is transmitted to the input and output conversion unit 169 and is not transmitted to the OS 150. The conversion angle will be described in detail. The conversion angle corresponds to a first regulation and a second regulation in the claims. The acceleration sensor 19 and the input and output conversion unit 169 correspond to a first detection unit in the claims.

The interface 180 (FIG. 2) is an interface for connecting various external devices OA which are supply sources of the content, to the control unit 10. As the external devices OA, a personal computer (PC), a mobile phone, a game terminal, and the like are used, for example. As the interface 180, a USB interface, a micro USB interface, an interface for a memory card, or the like can be used, for example.

The image display unit 20 includes the right display driving unit 22, the left display driving unit 24, the right light guide plate 261 as the right optical image display unit 26, the left light guide plate 262 as the left optical image display unit 28, and the 10-axis sensor 66.

The right display driving unit 22 includes a reception unit 53 (Rx 53), the right backlight control unit 201 (right BL control unit 201) and the right backlight 221 (right BL 221) functioning as light sources, the right LCD control unit 211 and the right LCD 241 functioning as display elements, and the right projection optical system 251. The right backlight control unit 201 and the right backlight 221 function as the light sources. The right LCD control unit 211 and the right LCD 241 function as the display elements. The right backlight control unit 201, the right LCD control unit 211, the right backlight 221, and the right LCD 241 are also collectively referred to as an "image light generation unit".

The reception unit 53 functions as a receiver for serial transmission between the control unit 10 and the image display unit 20. The right backlight control unit 201 drives the right backlight 221 based on the input control signal. The right backlight 221 is a luminescent body such as an LED or an electroluminescence (EL) device, for example. The right LCD control unit 211 drives the right LCD 241 based on the clock signal PCLK, the vertical synchronization signal VSync, the horizontal synchronization signal HSync, and the image data for a right eye input through the reception unit 53. The right LCD 241 is a transmission type liquid crystal panel in which a plurality of pixels are disposed in a matrix form.

The right projection optical system 251 is configured with a collimating lens which converts the image light emitted from the right LCD 241 into a luminous flux in a parallel state. The right light guide plate 261 as the right optical image display unit 26 reflects the image light output from the right projection optical system 251 along a predetermined light path and guides the reflected image light to the right eye RE of a user. The right projection optical system 251 and the right light guide plate 261 are also collectively referred to as a "light guide unit".

The left display driving unit 24 has the same configuration as that of the right display driving unit 22. The left display driving unit 24 includes a reception unit 54 (Rx 54), the left backlight control unit 202 (left BL control unit 202) and the left backlight 222 (left BL 222) functioning as light sources, the left LCD control unit 212 and the left LCD 242 functioning as display elements, and the left projection optical system 252. The left backlight control unit 202 and the left backlight 222 function as the light sources. The left LCD control unit 212 and the left LCD 242 function as the display elements. The left backlight control unit 202, the left LCD control unit 212, the left backlight 222, and the left LCD 242 are collectively referred to as an "image light generation unit". The left projection optical system 252 is configured with a collimating lens which converts the image light emitted from the left LCD 242 into a luminous flux in a parallel state. The left light guide plate 262 as the left optical image display unit 28 reflects the image light output from the left projection optical system 252 along a predetermined light path and guides the reflected image light to the left eye LE of a user. The left projection optical system 252 and the left light guide plate 262 are also collectively referred to as a "light guide unit".

Figure 3:
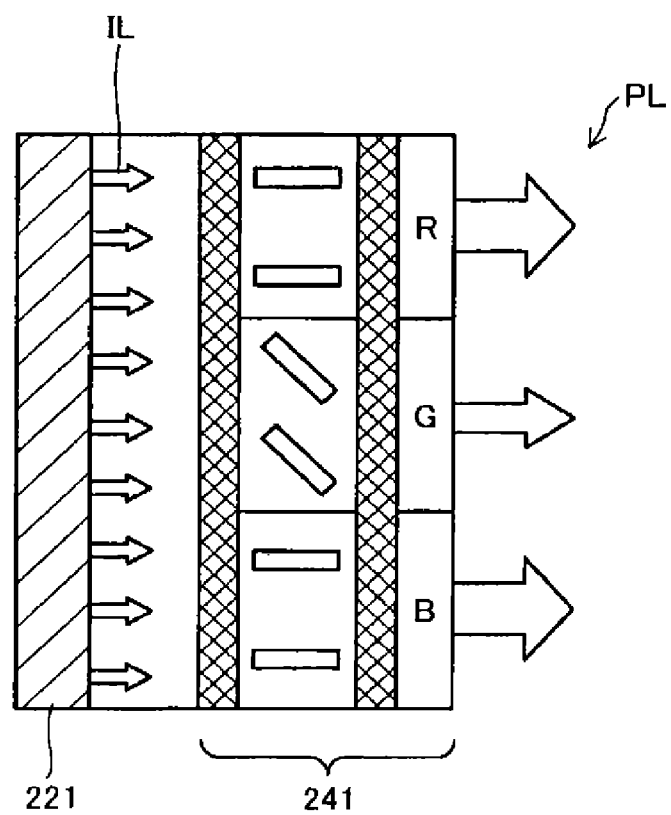
FIG. 3 is an explanatory diagram showing a state of image light emitted by an image light generation unit.

FIG. 3 is an explanatory diagram showing a state of image light emitted by the image light generation unit. The right LCD 241 drives the liquid crystal in each pixel position disposed in a matrix form to change the transmittance of the light passing through the right LCD 241, and accordingly modulates illumination light IL emitted from the right backlight 221 into effective image light PL showing an image. The left image light generation unit has the same configuration. As shown in FIG. 3, the backlight system is used in the embodiment, but the image light may be emitted using a front light system or a reflection system.

A-2. Display Image Control Process

Figure 4:
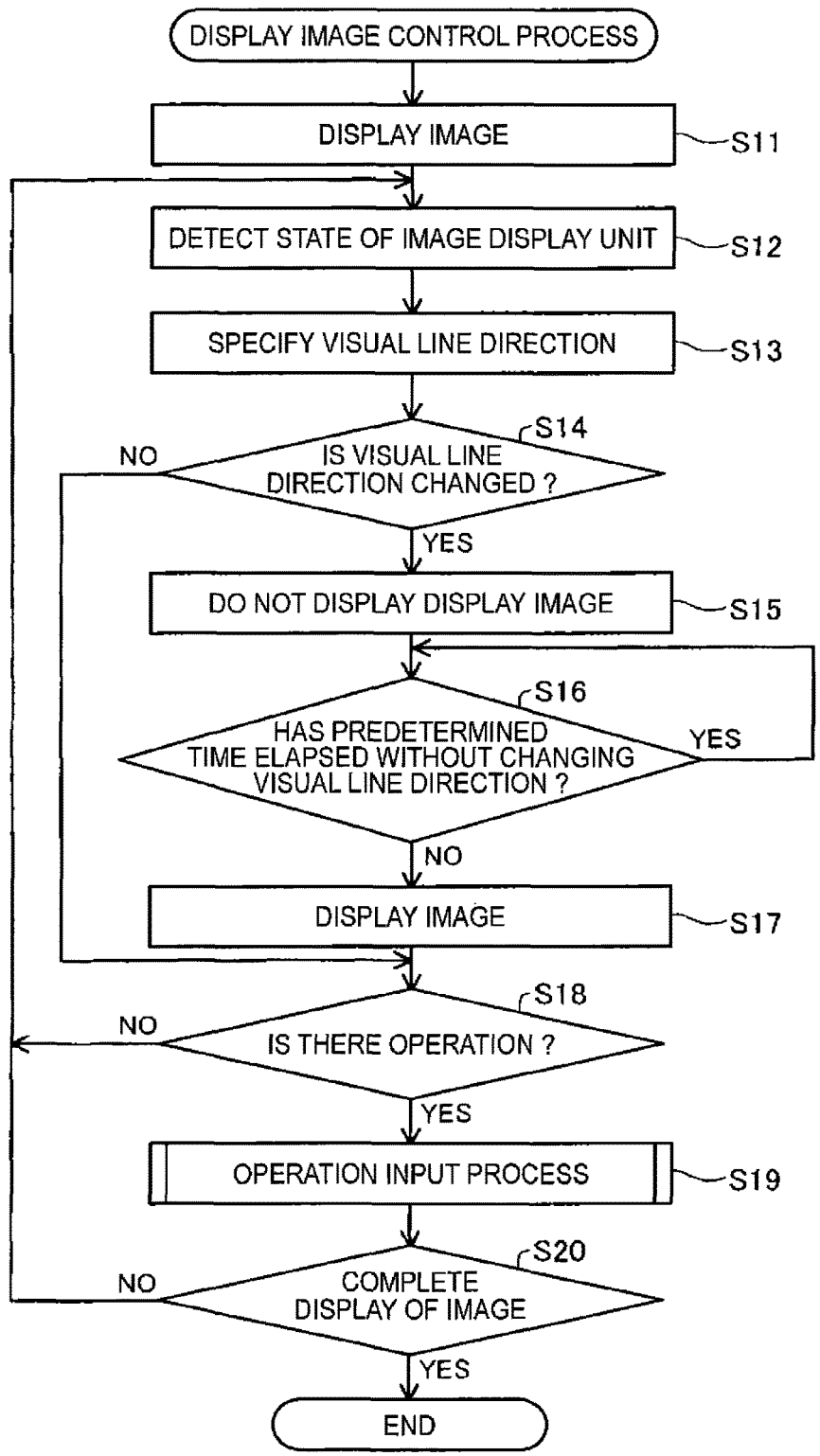
FIG. 4 is an explanatory diagram showing a flow of a display image control process.

FIG. 4 is an explanatory diagram showing the flow of a display image control process. The display image control process is a process in which a display image displayed on the image display unit 20 is controlled according to the changed angle of the visual line direction of a user specified by the 10-axis sensor 66 and the direction determination unit 166 and the output signal converted by the input and output conversion unit 169, after the image is displayed on the image display unit 20.

In the display image control process, first, the image display unit 20 displays an image based on the image signal transmitted from the image processing unit 160 (Step S11). Next, the 10-axis sensor 66 detects a state of the image display unit 20 (Step S12). In the embodiment, the 10-axis sensor 66 detects the acceleration of the image display unit 20 and then the control of the display image according to the detected acceleration is performed. Next, the direction determination unit 166 specifies a visual line direction of a user based on the detected acceleration (Step S13). Then, the direction determination unit 166 determines whether or not the visual line direction is changed (Step S14). When the changed angle of the visual line direction is equal to or greater than the threshold value, it is determined that the visual line direction is changed (Step S14: YES), and the image processing unit 160 does not display the display image displayed on the image display unit 20.

Figure 5A:
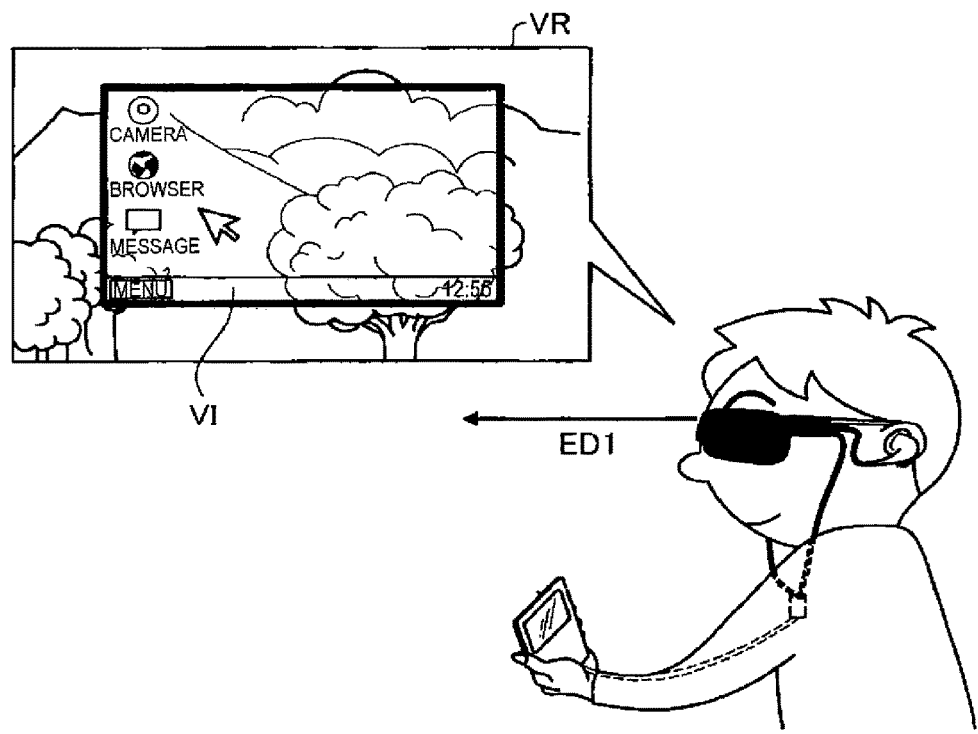
FIGS. 5A and 5B are explanatory diagrams showing schematic visual fields which are visually recognized by a user before and after changing a visual line direction.
Figure 5B:
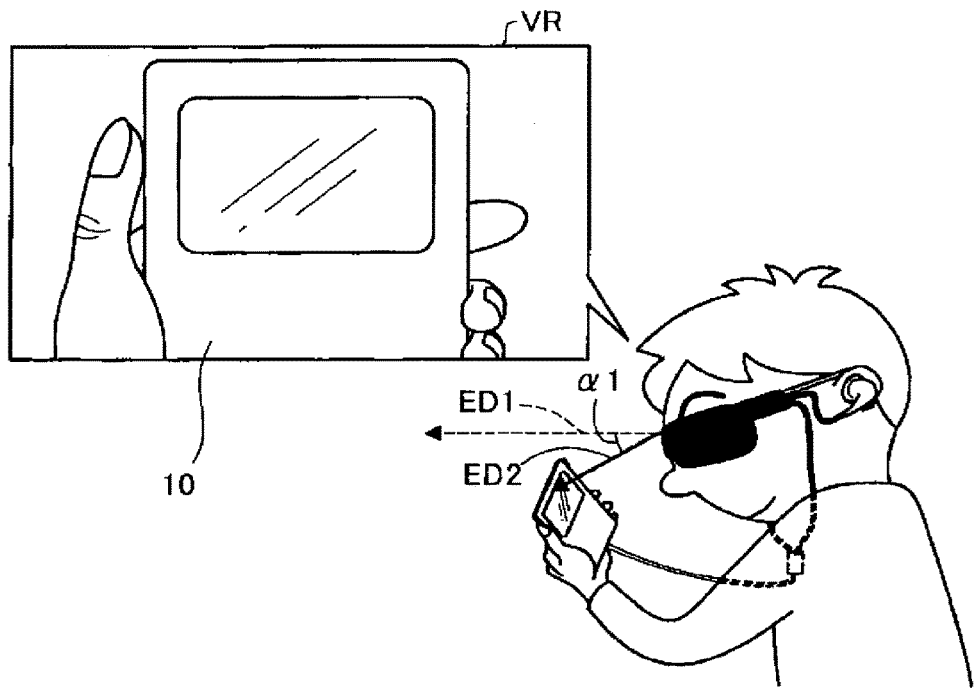

FIGS. 5A and 5B are explanatory diagrams showing schematic visual fields VR which are visually recognized by a user before and after changing the visual line direction. FIG. 5A shows the visual field VR visually recognized by a user before the visual line direction of a user is changed. As shown in FIG. 5A, a user visually recognizes a display image VI. The display image VI includes a pointer PO which moves to be interlocked with a finger touching the track pad 14. The visual line direction ED1 of a user is the same direction as the horizontal direction. FIG. 5B shows a visual field VR visually recognized by a user after the visual line direction of a user is changed. As shown in FIG. 5B, a user glances down, and not in the horizontal direction, and gazes at the control unit 10. In this case, the visual line direction ED1 of a user is changed to a visual line direction ED2. Since an angle α1 formed by the visual line direction ED1 and the visual line direction ED2 is the changed angle equal to or greater than the preset threshold value, the image processing unit 160 does not display the display image VI after the visual line direction of a user is changed.

Next, the direction determination unit 166 determines whether or not the predetermined time (for example, 5 seconds) has elapsed after it is determined that the visual line direction of a user is changed (Step S16 of FIG. 4). When it is determined that the predetermined time has not elapsed (Step S16: NO), the image processing unit 160 awaits the elapse of the predetermined time. When it is determined that the predetermined time has elapsed (Step S16: YES), the image processing unit 160 displays the display image VI on the image display unit 20 again (Step S17). Next, when the display image VI is displayed on the image display unit 20 (Step S17), or when it is determined that the changed angle of the visual line direction is smaller than the threshold value and the visual line direction is not changed in the process in Step S14 (Step S14: NO), the control unit 10 monitors the reception of the operation with respect to the operation unit 135 (Step S18). When the reception of the operation is not detected (Step S18: NO), processes subsequent to Step S12 are repeated. When the reception of the operation such as touching by a finger of a user on the track pad 14 is detected (Step S18: YES), the control unit 10 performs an operation input process (Step S19).

Figure 6:
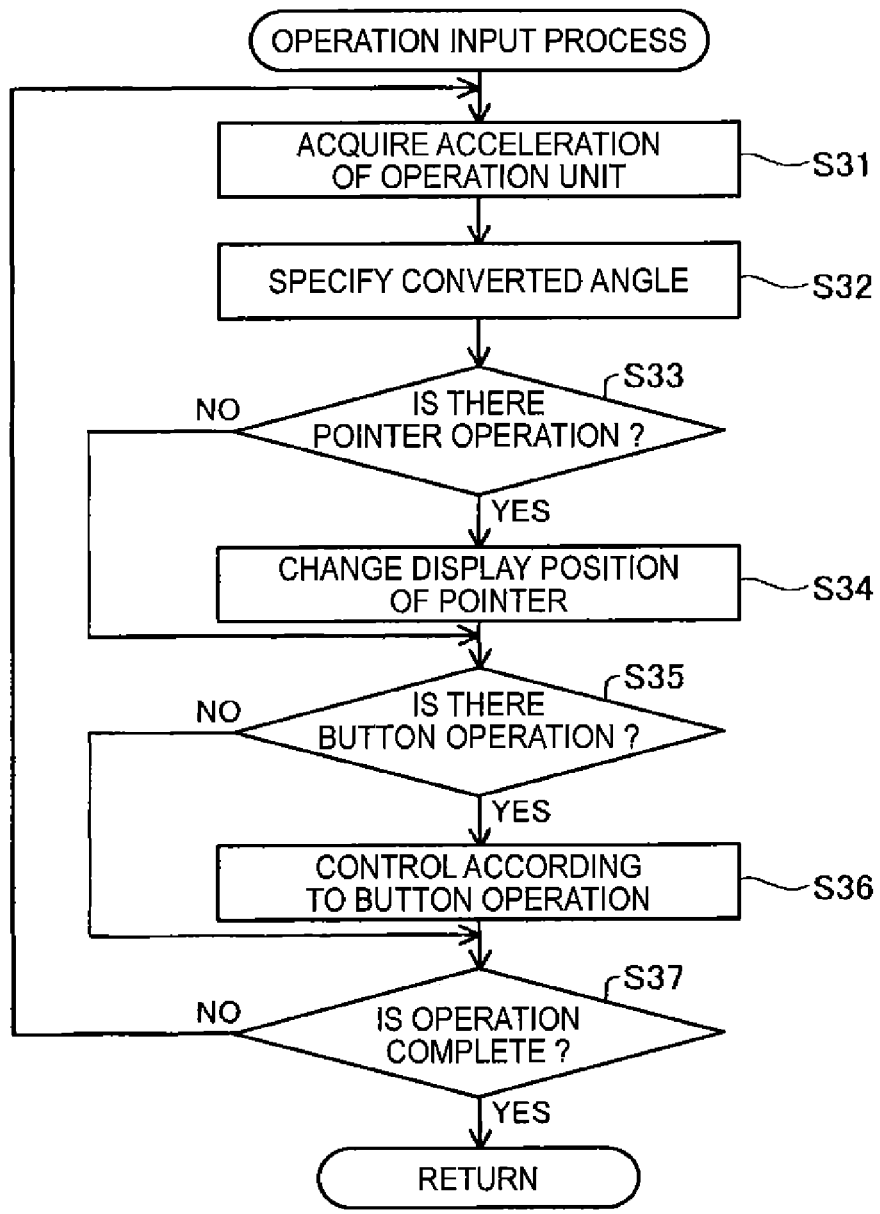
FIG. 6 is an explanatory diagram showing a flow of an operation input process.

FIG. 6 is an explanatory diagram showing a flow of the operation input process. In the operation input process, first, the acceleration sensor 19 acquires the acceleration acting on the control unit 10 in which the operation unit 135 is formed (Step S31). Next, the input and output conversion unit 169 specifies the converted angle based on a relationship between the acquired acceleration and the direction of gravity (Step S32). Then, the control unit 10 monitors the reception of the operation such as the changing of a position of a finger of a user in a state being touched to the track pad 14 of the operation unit 135 (hereinafter, also simply referred to as a "pointer operation") (Step S33). When the pointer operation is received (Step S33: YES), the image processing unit 160 changes the display position of the pointer PO on the display image VI, based on the received pointer operation (Step S34).

Figure 7:
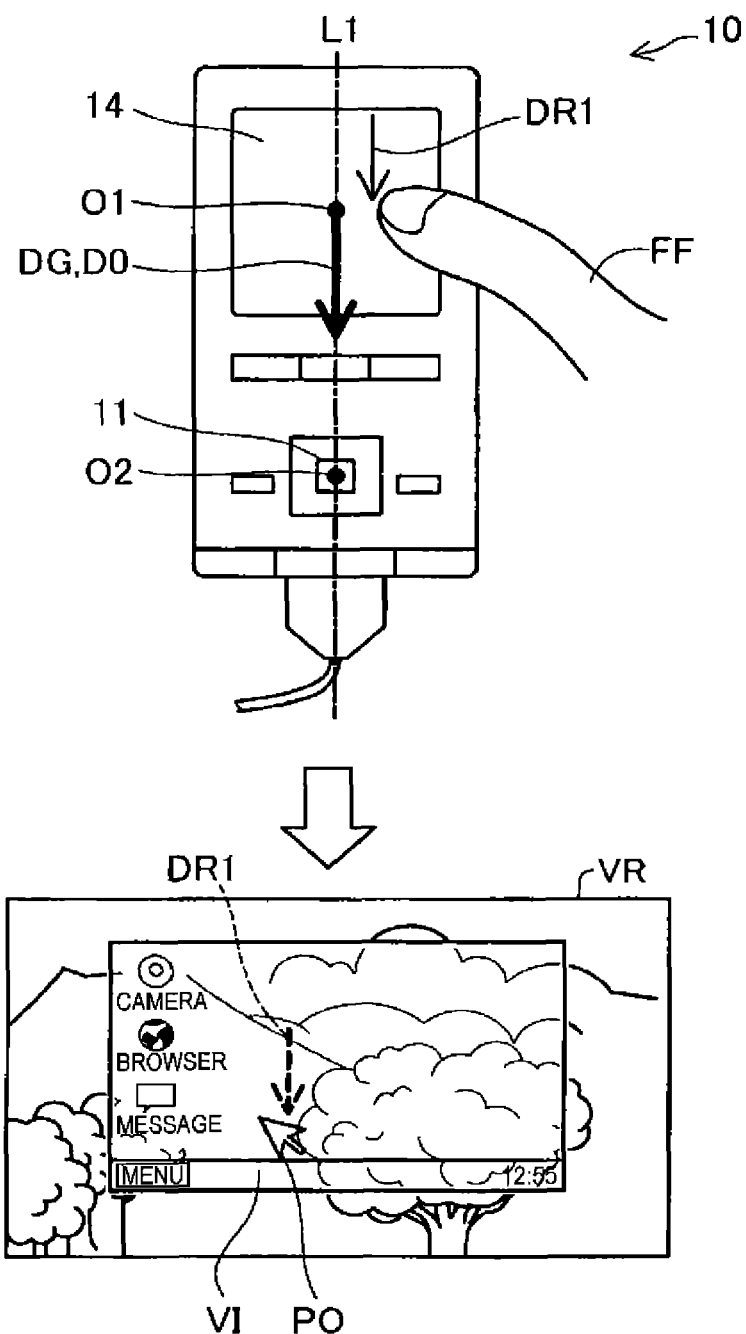
FIG. 7 is an explanatory diagram of a change of a display position of a pointer by a pointer operation.
Figure 8:
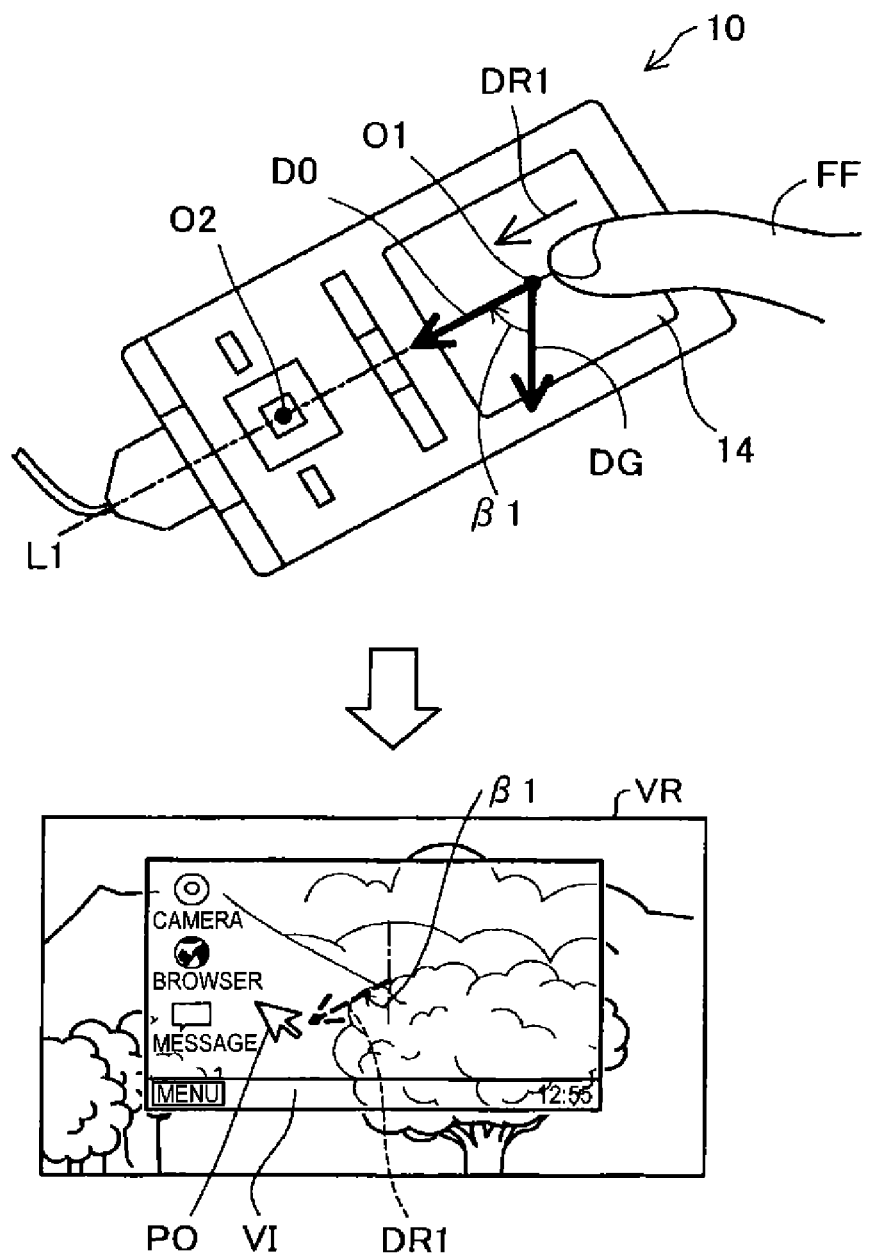
FIG. 8 is an explanatory diagram of a change of a display position of the pointer by a pointer operation.

FIG. 7 and FIG. 8 are explanatory diagrams of the changes of the display positions of the pointer PO by the pointer operation. FIG. 7 shows a linear line L1 passing through a center O1 of the track pad 14 and a center O2 of the determination key 11, the direction of gravity DG, and an operation direction DR1 of a forefinger FF of a user moved on the track pad 14, in the control unit 10. As shown in FIG. 7, the direction of gravity DG and the operation direction DR1 are the same direction. In addition, FIG. 7 shows the visual field VR of a user when the pointer operation is received. In the embodiment, the converted angle is set as 0 degrees as the initial setting, when a reference direction DO from the center O1 to the center O2 along the linear line L1 of the track pad 14 and the direction of gravity DG are the same direction. Accordingly, the converted angle is 0 degrees when the operation direction DR1 is the same direction as the reference direction DO, and thus, the input and output conversion unit 169 outputs the movement of the forefinger FF along the operation direction DR1 as the movement along the operation direction DR1, in the same manner.

FIG. 8 shows an example in which the input and output conversion unit 169 performs correction and output when the reference direction DO and the direction of gravity DG are not the same direction and the control unit 10 is inclined with respect to the direction of gravity compared to the initial setting. As shown in FIG. 8, since the control unit 10 is inclined, the direction of gravity DG and the reference direction DO form an angle β1. The angle β1 is 60 degrees. In this case, the input and output conversion unit 169 corrects the movement of the forefinger FF in the operation direction DR1 along the reference direction DO, by the amount of the angle β1 which is the converted angle, by setting a clockwise angle from the direction of gravity DG as a positive angle using the direction of gravity DG as a reference. That is, even when a relative direction of the operation direction DR1 with respect to the track pad 14 is the same as the reference direction DO, the output signal converted by the input and output conversion unit 169 is different depending on the direction of gravity DG acquired by the acceleration sensor 19. The OS 150 and the image processing unit 160 receive the output signal from the input and output conversion unit 169 and change the display position of the pointer PO, as shown in the display image VI of FIG. 8.

When the display position of the pointer PO on the display image VI is changed (Step S34 of FIG. 6) or the pointer operation is not received (Step S33: NO), the control unit 10 monitors the reception of a predetermined operation with respect to various buttons of the operation unit 135 (hereinafter, also referred to as a "button operation") (Step S35). When the predetermined button operation is received (Step S35: YES), the control unit 10 performs a predetermined control operation according to the button operation (Step S36). When the predetermined control operation is performed (Step S36) or the button operation is not received (Step S35: NO), the control unit 10 monitors the reception of the operation for completing the operation input process (Step S37). When the operation for completing the operation input process is not received (Step S37: NO), the control unit 10 continuously performs the processes subsequent to Step S31. When the operation for completing the operation input process is received (Step S37: YES), the control unit 10 completes the operation input process.

When the operation input process is completed (Step S19 of FIG. 4), the control unit 10 monitors the reception of an operation for completing the display of the image (Step S20). When the operation for completing the display of the image is not received (Step S20: NO), the control unit 10 continuously performs the processes subsequent to Step S12. When the operation for completing the display of the image is received (Step S20: YES), the control unit 10 completes the display image control process.

As described above, in the head mounted display 100 of the embodiment, the acceleration acting on the control unit 10 in which the operation unit 135 is formed, is acquired by the acceleration sensor 19, and the input and output conversion unit 169 specifies the converted angle based on the gravitational acceleration acting on the control unit 10, and transmits the output signal converted from the input received by the operation unit 135 to the OS 150 based on the converted angle. In addition, the 10-axis sensor 66 and the direction determination unit 166 specify the visual line direction of a user, and the OS 150 and the image processing unit 160 control the display image VI displayed on the image display unit 20 according to the change of the visual line direction. Accordingly, in the head mounted display 100 of the embodiment, since different control operations are performed in accordance with the detected results of the plurality of sensors, it is possible to perform various control operations with respect to the head mounted display 100.

In the head mounted display 100 of the embodiment, the acceleration sensor 19 is formed in the control unit 10 in which the operation unit 135 is formed, and acquires the gravitational acceleration acting on the control unit 10. Accordingly, in the head mounted display 100 of the embodiment, since the head mounted display 100 is controlled in accordance with the input of a user using the direction of gravity as a reference, and not the direction of the operation unit 135, a user can perform the input using the direction of gravity as a reference, regardless of the direction of the operation unit 135, and user operability is improved.

In the head mounted display 100 of the embodiment, when the changed angle of the visual line direction of a user specified by the 10-axis sensor 66 embedded in the image display unit 20 and the direction determination unit 166 is equal to or greater than the threshold value, the image processing unit 160 does not display the display image VI displayed on the image display unit 20. Accordingly, in the head mounted display 100 of the embodiment, since the display image VI is controlled according to the visual line direction of a user, sight or the like of a user changes in accordance with the state of a user, and user convenience is improved.

In the head mounted display 100 of the embodiment, the acceleration sensor 19 acquires the acceleration acting on the control unit 10 in which the operation unit 135 is formed, on a regular basis, once every 0.5 seconds. Accordingly, in the head mounted display 100 of the embodiment, it is not necessary to constantly acquire the acceleration acting on the control unit 10, and it is possible to suppress the load applied to the control unit 10 and to improve user convenience.

In the head mounted display 100 of the embodiment, the display image VI displayed on the image display unit 20 is controlled by the OS 150 and the image processing unit 160, and the input and output conversion unit 169 is configured with a device driver. Accordingly, in the head mounted display 100 of the embodiment, since the acceleration sensor 19 and the input and output conversion unit 169 corresponding to only the operation unit 135 are used, the load of the CPU 140 is decreased, it is not necessary to change the software such as the OS 150, and it is possible to reduce a development period of the head mounted display 100.

B. Modification Example

The invention is not limited to the embodiment and can be executed in various embodiments within a range not departing from the gist thereof, and for example, the following modifications can also be performed.

B1. Modification Example 1

In the embodiment, the 10-axis sensor 66 embedded in the image display unit 20 detects the state of the image display unit 20, and the acceleration sensor 19 included in the control unit 10 acquires the acceleration acting on the control unit 10, however, various modifications can be performed regarding the embodiment of each sensor. For example, the change of the direction of the control unit 10 and the position of the image display unit 20 is detected by a camera installed on a portion different from the control unit 10 and the image display unit 20, and the display image VI of the image display unit 20 may be controlled based on the detected results.

A 10-axis sensor may be embedded in the control unit 10 separately from the acceleration sensor 19, instead of the 10-axis sensor 66 embedded in the image display unit 20. For example, the inputs to the track pad 14 may be converted and output by the acceleration sensor 19 and the input and output conversion unit 169, and the operation such as determination of an icon included in the display image VI may be performed, according to the change of the acceleration detected by the 10-axis sensor embedded in the control unit 10. In the head mounted display 100 of this modification example, a user can sensorially perform various operations, and user convenience is improved.

In the embodiment described above, the switching is performed to display or not to display the display image VI of the image display unit 20 according to the changed angle detected by the 10-axis sensor 66 of the image display unit 20, however, various modifications can be performed regarding the content of the head mounted display 100 controlled by the detected results of the 10-axis sensor 66. For example, when a user looks down, the display image VI may be displayed at the upper portion in the formed area, and when a user looks up, the display image VI may be displayed at the lower portion of the area. That is, the display image VI may be controlled by the direction of the image display unit 20 detected by the 10-axis sensor 66. In addition, as the content to be controlled by the head mounted display 100, the sound may be output by the sound processing unit 170 and the earphones 32 and 34, instead of the display image VI of the image display unit 20. The control unit 10 may perform a control operation for vibrating the image display unit 20.

In the embodiment, the display position of the pointer PO is changed by converting the pointer operation based on the converted angle, but the regulation for converting the input into the output based on the direction of the operation unit 135 is not limited thereto, and various modifications can be performed. For example, a gyro sensor may be embedded in the control unit 10, instead of the acceleration sensor 19, the angular velocity of the control unit 10 may be detected as the change of the direction of the operation unit 135, and the display image VI may be controlled based on the angular velocity. In this case, the control unit 10 itself is horizontally and vertically moved as a stick for an operation, and the display position of the pointer PO on the display image VI is changed. In this modification example, since a user can operate the entire control unit 10 including the operation unit 135 as one operation unit, an intuitive operation is easily performed, and operability and user convenience are improved.

In the embodiment, the converted angle is specified based on the angle β1 between the reference direction DO of the operation unit 135 and the direction of gravity, however, specifying is not limited to being based on the direction of the operation unit 135, and various modifications can be performed. For example, a state where the operation of the operation unit 135 may be received and a state where the operation thereof may not be received, may be switched, according to the angle between an axis orthogonal to the track pad 14 of the operation unit 135 and the direction of the gravitational acceleration. In detail, when the angle formed by the direction of an orthogonal axis facing the front side from the rear side of the track pad 14 and the direction of the gravitational acceleration is equal to or smaller than 90 degrees, that is, when an operation surface of the track pad 14 faces the direction of the gravitational acceleration, it is determined that a user does not perform the operation, and the input and output conversion unit 169 may be set to a power saving mode in which the operation may not be received. In contrast, when the angle formed by the direction of the orthogonal axis and the direction of the gravitational acceleration is greater than 90 degrees, it is determined that a user is supposed to perform the operation, and the input and output conversion unit 169 may be set to a standby mode in which the operation may be received. In this modification example, when the operation surface of the track pad 14 faces the direction of the gravitational acceleration, the mode may not be in the standby mode in which the input may be received, and accordingly it is possible to suppress power consumption of the head mounted display 100. In this modification example, the angle of 90 degrees is described as an example of the angle formed by the orthogonal axis and the direction of the gravitational acceleration, but the angle thereof is not limited thereto, and various modifications can be performed. When the operation unit 135 is operated, the angle may be arbitrarily set. The state where the angle formed by the direction of the orthogonal axis and the direction of the gravitational acceleration in the modification example is equal to or smaller than 90 degrees, corresponds to a first state in the claims, and the state where the angle thereof is greater than 90 degrees corresponds to a second state in the claims.

The regulation for converting the input into the output based on the direction of the operation unit 135 may be arbitrarily changed by receiving the predetermined operation. For example, the conversion based on the converted angle specified according to the direction of the operation unit 135 and the setting of the state based on the angle formed by the direction of the orthogonal axis and the direction of the gravitational acceleration, may be changed based on the operation received by the operation unit 135. In addition, infrared light emitted by an infrared light emitting unit formed in the image display unit 20 is received by an infrared light receiving unit formed near the track pad 14, and accordingly, even when the direction of the orthogonal axis and the direction of the gravitational acceleration are the same, the operation unit 135 may be set to a state where the operation may be received. In this case, it is even possible to operate the head mounted display 100 in a state where a user lies around, with operability and user convenience being improved. The same state may be set by imaging the control unit 10 by a camera formed in the image display unit 20, instead of the infrared light emitting unit and the infrared light receiving unit of this modification example. Various modifications can be performed regarding the setting for changing the regulation for converting the input into the output according to a positional relationship between the direction of the image display unit 20 and the direction of the operation unit 135. The state where the infrared light emitted by the infrared light emitting unit of this modification example is received by the infrared light receiving unit, corresponds to a first state in the claims, and the state where the infrared light is not received by the infrared light receiving unit, corresponds to a second state in the claims.

B2. Modification Example 2

In the embodiment, the input and output conversion unit 169 corrects the output by the amount of the angle β1 of the converted angle formed by the reference direction DO and the direction of gravity DG, but various modifications can be performed regarding the converted angle to be corrected. For example, the input and output conversion unit 169 may correct the output based on the four converted angles, according to the angle β1 formed by the reference direction DO and the direction of gravity DG. When the angle β1 is from 0 degrees to 45 degrees or from 315 degrees to less than 360 degrees, the input and output conversion unit 169 sets the converted angle to 0 by assuming the reference direction DO and the direction of gravity DG to be the same directions. In the same manner as described above, the input and output conversion unit 169 may set the converted angle to 90 degrees when the angle β1 is greater than 45 degrees and equal to or smaller than 135 degrees, may set the converted angle to 180 degrees when the angle β1 is greater than 135 degrees and smaller than 225 degrees, and may set the converted angle to 270 degrees when the angle β1 is equal to or greater than 225 degrees and smaller than 315 degrees. In this modification example, since there are only four converted angles, it is easy to correct the input received by the track pad 14 to the output, it is possible to decrease the load of the system, and it is possible to reduce the frequency of acquiring the acceleration acting on the control unit 10 by the acceleration sensor 19. With the input received by the track pad 14, the input received by the direction key 16 may be corrected to the output based on the converted angle. In this modification example, the input and output conversion unit 169 divides the angle β1 into four ranges, and corrects the input received by the track pad 14 to the output according to the angle β1.

In the embodiment, when the reference direction DO and the direction of gravity DG are different from each other, the output is corrected by the amount of the angle β1, but the correction of the output may not be performed, even when the reference direction DO and the direction of gravity DG are different from each other. For example, the menu key 17 or the like of the operation unit 135 is pressed down for a predetermined time or longer (hereinafter, also referred to as a "long press"), and accordingly, the converted angle at a time point when the long press is started may be maintained. In this modification example, for example, even when a state of a user is changed from the sitting state to a laying-down state, and the operation unit 135 is operated in the laying-down state, the relative direction of receiving the operation of the operation unit 135 with respect to a user is not changed, and accordingly user convenience is improved.

B3. Modification Example 3

In the embodiment, the input and output conversion unit 169 is set as the device driver which transmits the output signal to the OS 150, but various modifications can be performed regarding the configuration of the input and output conversion unit 169. For example, the input and output conversion unit 169 may be configured between the device driver and the OS 150 in a layered structure of the system, or may be configured in middleware which is between the hardware and the software (for example, hardware abstraction layer (HAL)). The operating system in the claim is software which provides basic functions commonly used for multiple application software, such as the input received by the operation unit 135, the input and output functions for displaying the display image VI, or management of a disk or a memory, and manages the entire computer system. In addition, the device driver in the claim is software which controls or operates the device mounted in the computer or a device connected to the outside. Further, the middleware in the claim is software which is operated on the OS 150 and provides advanced specific functions other than the OS 150 with respect to the application software.

In the embodiment, the head mounted display 100 is described as an example of the information processing apparatus including the operation unit, however, it does not necessarily have to be the head mounted display, and various modifications can be performed regarding the embodiment of the information processing apparatus. For example, the information processing apparatus may be a device including a device which displays an image on a display disposed on a monitor, instead of the image display unit 20.

B4. Modification Example 4

In the embodiment, the operation unit 135 is formed in the operation unit 10, however, various modifications can be performed regarding the embodiment of the operation unit 135. For example, a user interface which is the operation unit 135 may be used separately from the control unit 10. In this case, since the operation unit 135 is provided separately from the control unit 10 in which the power 130 or the like is formed, it is possible to perform miniaturization and user operability is improved.

For example, the image light generation unit may have a configuration including an organic electro-luminescence (EL) display and an organic EL control unit. For example, as the image light generation unit, a liquid crystal on silicon (LCOS; LCoS is trademark) or a digital micro mirror device can be used, instead of the LCD. For example, the invention can also be applied to a laser retina projection type head mounted display 100.

For example, the head mounted display 100 may be a head mounted display having the embodiment in which the optical image display unit only covers a part of the eyes of a user, that is, the embodiment in which the optical image display unit does not entirely cover the eyes of a user. In addition, the head mounted display 100 may be a so-called single eye type head mounted display. The head mounted display 100 is set as a both eye type optical transmission type device, but the invention can also be applied to a head mounted display of another type such as a video transmission type device, for example.

In addition, as the earphone, an ear wearable type or a head band type device may be used, or the earphone may be omitted. For example, a head mounted display loaded on a vehicle such as a car or an airplane may be configured. Ahead mounted display embedded in a body protecting device such as a helmet may be configured.

B5. Modification Example 5

A configuration of the head mounted display 100 of the embodiment is one example, and various modifications can be performed thereon. For example, one of the direction key 16 and the track pad 14 provided in the control unit 10 may be omitted, or the other operation interface such as a stick for an operation may be provided in addition to the direction key 16 and the track pad 14 or instead of the direction key 16 and the track pad 14. The control unit 10 may be configured to be connected to an input device such as a keyboard or a mouse so as to receive the input from the keyboard or the mouse.

As the image display unit, instead of the image display unit 20 mounted as the glasses, an image display unit of another type such as an image display unit mounted as a hat, for example, may be used. The earphones 32 and 34 or an external scenery imaging camera 61 can be suitably omitted. In the embodiment, the LCD and the light source are used as the configuration for generating the image light, but instead thereof, another display element such as an organic EL display may be used. In the embodiment, the 10-axis sensor 66 is used as the sensor for detecting the movement of the head of a user, but instead thereof, a sensor configured with one or two of an acceleration sensor, an angular velocity sensor, a geomagnetism sensor, and an atmosphere sensor may be used.

Figure 9A:
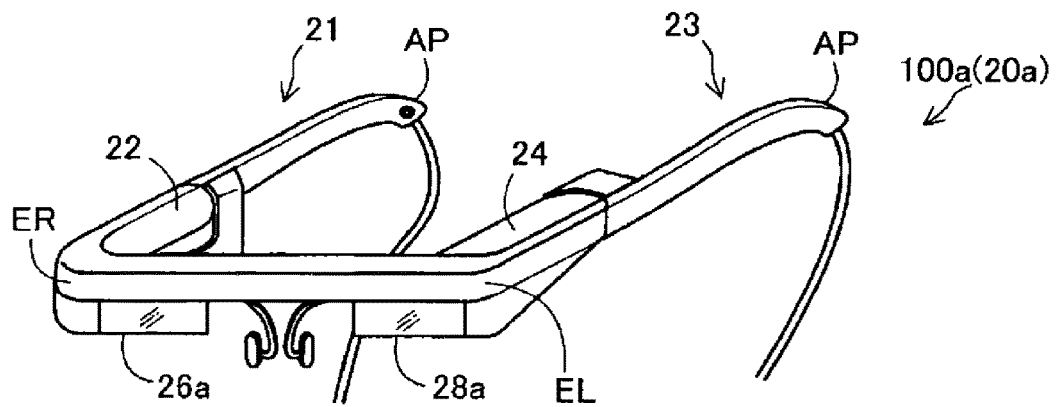
FIGS. 9A and 9B are explanatory diagrams showing appearance configurations of a head mounted display of Modification Examples.
Figure 9B:
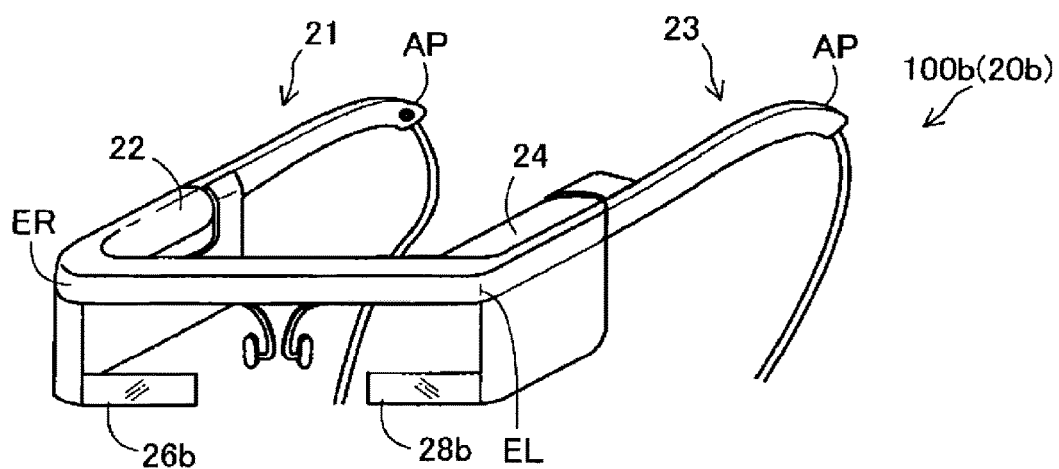

FIGS. 9A and 9B are explanatory diagrams showing appearance configurations of the head mounted display of the modification examples. In a case of an example of FIG. 9A, the differing points from the head mounted display 100 shown in FIG. 1 are that an image display unit 20a includes a right optical image display unit 26a instead of the right optical image display unit 26 and includes a left optical image display unit 28a instead of the left optical image display unit 28. The right optical image display unit 26a is formed to be smaller than the optical member of the embodiment described above, and is disposed at an obliquely upper portion of the right eye of a user when mounting a head mounted display 100a. In the same manner as described above, the left optical image display unit 28a is formed to be smaller than the optical member of the embodiment described above, and is disposed at an obliquely upper portion of the left eye of a user when mounting the head mounted display 100a. In a case of an example of FIG. 9B, the differing points from the head mounted display 100 shown in FIG. 1 are that an image display unit 20b includes a right optical image display unit 26b instead of the right optical image display unit 26 and includes a left optical image display unit 28b instead of the left optical image display unit 28. The right optical image display unit 26b is formed to be smaller than the optical member of the embodiment described above, and is disposed at an obliquely lower portion of the right eye of a user when mounting a head mounted display. The left optical image display unit 28*b* is formed to be smaller than the optical member of the embodiment described above, and is disposed at an obliquely lower portion of the left eye of a user when mounting the head mounted display. As described above, the optical image display units are not limited as long as they are disposed near the eyes of a user. The size of the optical members configuring the optical image display units is also arbitrarily set, and it is possible to realize the head mounted display 100 having the embodiment in which the optical image display unit covers only a part of the eyes of a user, that is, the embodiment in which the optical image display unit does not entirely cover the eyes of a user.

In the embodiment, the head mounted display 100 may guide the image light showing the same images to the right and left eyes of a user to allow a user to visually recognize a two-dimensional image, or may guide the image light showing the different images to the right and left eyes of a user so as to allow a user to visually recognize a three-dimensional image.

In the embodiment, a part of the configuration realized with the hardware may be replaced with the software, and conversely, a part of the configuration realized with the software may be replaced with the hardware. For example, in the embodiment, the image processing unit 160 or the sound processing unit 170 is realized by reading out and executing the computer programs with the CPU 140, however, the functional units may be realized by a hardware circuit.

When some or all of the functions of the invention are realized with the software, the software (computer programs) can be provided in a state of being stored in a computer-readable recording medium. In the invention, the "computer-readable recording medium" is not limited to a mobile recording medium such as a flexible disk or a CD-ROM, but also includes various internal recording devices in the computer such as a RAM or a ROM, or external recording devices fixed to the computer such as a hard disk.

In the embodiment, as shown in FIG. 1 and FIG. 2, the control unit 10 and the image display unit 20 are formed with separate configurations, however, the configurations of the control unit 10 and the image display unit 20 are not limited, and various modifications can be performed. For example, the entirety or a part of the configuration formed in the control unit 10 may be formed in the image display unit 20. The power 130 of the embodiment may be formed alone to be replaced, or may be formed in the image display unit 20 with the same configuration formed in the control unit 10. For example, the CPU 140 shown in FIG. 2 may be formed in both of the control unit 10 and the image display unit 20, or the functions performed by the CPU 140 formed in the control unit 10 and a CPU formed in the image display unit 20 may be configured separated.

The control unit 10 may be embedded in the PC and the image display unit 20 may be used instead of the monitor of the PC, or the control unit 10 and the image display unit 20 may be integrally provided to be attached to the clothing of a user as a wearable computer.

The invention is not limited to the embodiments and modification examples, and can be realized with various configurations within a range not departing from the scope thereof. For example, the technical features in the embodiments and the modification examples corresponding to technical features in each embodiment disclosed in the summary of the invention can be suitably replaced or combined, in order to solve some or all of the problems described above or in order to realize some or all of the advantages described above. The technical features can be suitably removed, as long as the technical features are not described as compulsory in the specification.

What is claimed is:

1. An information processing apparatus comprising:
an operation receiver which receives an operation; and
a processor programmed to
detect a direction of the operation receiver based on a signal from one or more sensors,
convert an input of the operation received by the operation receiver into an output based on a first regulation, when the direction of the operation receiver is in a first state, and convert the input into an output based on a second regulation which is different from the first regulation, when the direction of the operation receiver is in a second state which is different from the first state,
detect an apparatus state which is at least one of a position and a direction of the information processing apparatus based on a signal from the one or more sensors, and
perform a control process of the information processing apparatus, based on the apparatus state, wherein
when an angle formed by a direction of an orthogonal axis facing a front side from a rear side of the operation receiver and a direction of a gravitational acceleration is equal to or smaller than a predetermined angle, the processor is set to a first mode in which the operation is not received, and
when the angle is greater than the predetermined angle, the processor is set to a second mode in which the operation is received.

2. The information processing apparatus according to claim 1,
wherein the processor is disposed in the operation receiver and further programmed to detect the direction of the operation receiver using the acceleration of the operation receiver.

3. The information processing apparatus according to claim 2, wherein the first state and the second state are determined based on a relationship between the direction of the operation receiver and the direction of gravity.

4. The information processing apparatus according to claim 3, wherein the first state is a state where an operation angle formed by the direction of the operation receiver and the direction of gravity is equal to or smaller than 45 degrees, and
the second state is a state where the operation angle is greater than 45 degrees.

5. The information processing apparatus according to claim 4,
wherein the second state includes a third state where the operation angle is greater than 45 degrees and equal to or smaller than 135 degrees, and a fourth state where the operation angle is greater than 135 degrees, and
the processor is further programmed to convert the input of the operation received by the operation receiver into an output based on a third regulation different from the first regulation, in a case of the third state, and convert the input into an output based on a fourth regulation different from the first regulation and the third regulation, in a case of the fourth state.

6. The information processing apparatus according to claim 1, further comprising:

an image display which forms image light based on image data and allows a user to visually recognize the image light as a virtual image, in a state of being mounted on the head of a user,
wherein the apparatus state is at least one of a position and a direction of the operation receiver or the image display, and
the processor is further programmed to control the image light formed by the image display, as the control process.

7. The information processing apparatus according to claim 6,
wherein the processor is disposed in the image display, and is further programmed to detect at least one of the position and the direction of the image display, and set a position of the image light formed in the image display, as the control process.

8. The information processing apparatus according to claim 1,
wherein the processor is further programmed to detect the direction of the operation receiver with a frequency of less than once every 0.5 seconds.

9. The information processing apparatus according to claim 1,
wherein the processor includes an operating system; and a device driver or middleware.

10. The information processing apparatus according to claim 1,
wherein when the direction of the orthogonal axis and the direction of the gravitational acceleration are the same and an image display and a controller, in which the operation receiver is disposed, face each other, the processor is set to a standby mode.

11. The information processing apparatus according to claim 10,
wherein an infrared light sender and an infrared light receiver or a camera formed in the image display is configured to determine when the image display and the controller face each other.

12. The information processing apparatus according to claim 1,
wherein when a user input of a predetermined operation is received, a converted angle at a time point when the user input of the predetermined operation is started is maintained the converted angle being an angle specified based on the direction of the gravitational acceleration and a reference direction of the operation receiver.

13. The information processing apparatus according to claim 1, further comprising:
an image display, wherein when a user changes a visual line direction, an image is not displayed by the image display and when a determination is made that a predetermined time has elapsed after a determination is made that the visual line direction is changed, the image is displayed by the image display.

14. A control method of an information processing apparatus including an operation receiver which receives an operation, and a processor programmed to detect a direction of the operation receiver based on a signal from one or more sensors, and detect an apparatus state which is at least one of a position and a direction of the information processing apparatus based on a signal from the one or more sensors, the method comprising:
converting an input of the operation received by the operation receiver into an output based on a first regulation, when the direction of the operation receiver is in a first state, and converting the input into an output based on a second regulation which is different from the first regulation, when the direction of the operation receiver is in a second state which is different from the first state; and
performing a control process of the information processing apparatus, based on the apparatus state, wherein
when an angle formed by a direction of an orthogonal axis facing a front side from a rear side of the operation receiver and a direction of a gravitational acceleration is equal to or smaller than a predetermined angle, the processor is set to a first mode in which the operation is not received, and
when the angle is greater than the predetermined angle, the processor is set to a second mode in which the operation is received.

* * * * *